(12) United States Patent
Srinivasan et al.

(10) Patent No.: US 7,191,453 B2
(45) Date of Patent: Mar. 13, 2007

(54) DISCOVERY AND INTEGRATION OF JINI SERVICES IN NON-JAVA CLIENTS

(75) Inventors: Krishnamurthy Srinivasan, Chandler, AZ (US); Edala R. Narasimha, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 1113 days.

(21) Appl. No.: 09/734,333

(22) Filed: Nov. 30, 2000

(65) Prior Publication Data

US 2002/0092000 A1    Jul. 11, 2002

(51) Int. Cl.
*G06F 13/00* (2006.01)
*G06F 3/00* (2006.01)
*G06F 9/45* (2006.01)
*G06F 9/46* (2006.01)
*G06F 9/44* (2006.01)

(52) U.S. Cl. .................. 719/330; 719/310; 719/328; 717/116; 717/136

(58) Field of Classification Search ............ 717/110, 717/108, 137, 136, 116; 709/230, 246; 707/103 R, 707/10

See application file for complete search history.

(56) References Cited

U.S. PATENT DOCUMENTS

| 5,995,506 | A  | * | 11/1999 | Fujimori .................... 370/389 |
| 6,253,122 | B1 | * | 6/2001  | Razavi et al. ................ 701/1 |
| 6,253,367 | B1 | * | 6/2001  | Tran et al. .................. 717/108 |
| 6,263,498 | B1 | * | 7/2001  | Alcorn et al. ............... 717/110 |
| 6,330,711 | B1 | * | 12/2001 | Knutson ...................... 717/100 |
| 6,430,570 | B1 | * | 8/2002  | Judge et al. ............. 707/103 R |
| 6,442,748 | B1 | * | 8/2002  | Bowman-Amuah ......... 717/108 |
| 6,473,759 | B1 | * | 10/2002 | Herrendoerfer et al. ...... 707/10 |
| 6,594,700 | B1 | * | 7/2003  | Graham et al. ............. 709/230 |
| 6,609,158 | B1 | * | 8/2003  | Nevarez et al. ............ 709/316 |
| 6,654,801 | B2 | * | 11/2003 | Mann et al. ................ 709/224 |
| 6,675,159 | B1 | * | 1/2004  | Lin et al. ........................ 707/3 |

* cited by examiner

*Primary Examiner*—Antony Nguyen-Ba
(74) *Attorney, Agent, or Firm*—Fish & Richardson P.C.

(57) ABSTRACT

A system of forming a bridge between non Java services and a Jini (™) interface. A non Java service is encapsulated using special code which makes it look like a Java service. Other aspects are also automatically formed. The Java service is automatically published with a broker such as a Jini (™) broker.

26 Claims, 3 Drawing Sheets

DISCOVERY AND INTEGRATION OF JINI SERVICES IN NON-JAVA CLIENTS

BACKGROUND

Jini™ is an established specification which allows application services to announce their availability dynamically. Users of services can dynamically find an application service using Jini™. Examples can include services providing freight rates, stock quotes, price inventory levels for products or modules (e.g., calculators) for applications. Jini™ operates by registering services, and responding to client inquiries about one of these services. Jini™ also provides proxy code to the client allowing the client to communicate with the services. In this way, Jini™ acts as a broker between the client and the existing services.

Jini™ has been written in a way such that it can only be used by services written in Java™. Many non-Java™ services ("legacy" services), however exist. These services cannot operate through Jini™.

BRIEF DESCRIPTION OF THE DRAWINGS

These and other aspects will now be described in detail with reference to the accompanying drawings.

DETAILED DESCRIPTION

The present application defines a bridge between non Java™ services and a client which is requesting such services. More specifically, the bridge provides a code generator to generate a proxy code that wraps the non-Java™ object, and hence enables communication between the client and the service. A surrogate object publishes information about the service and proxy. The surrogate object maintains this information using the Jini™ protocol. In this way, Jini™ can be used in its normal way, but can used as a broker for non-Java™ services. Jini™ stores the code, by indexing the code directly, or by indexing proxy code.

The current Jini™ interface will register services which have a Java™ Application Programming Interface ("API"). Services without a Java™ API cannot be registered with Jini™. While the present application specifically describes using Jini™, it should be understood that any service requiring a Java™ API could be similarly used.

Figure 1:
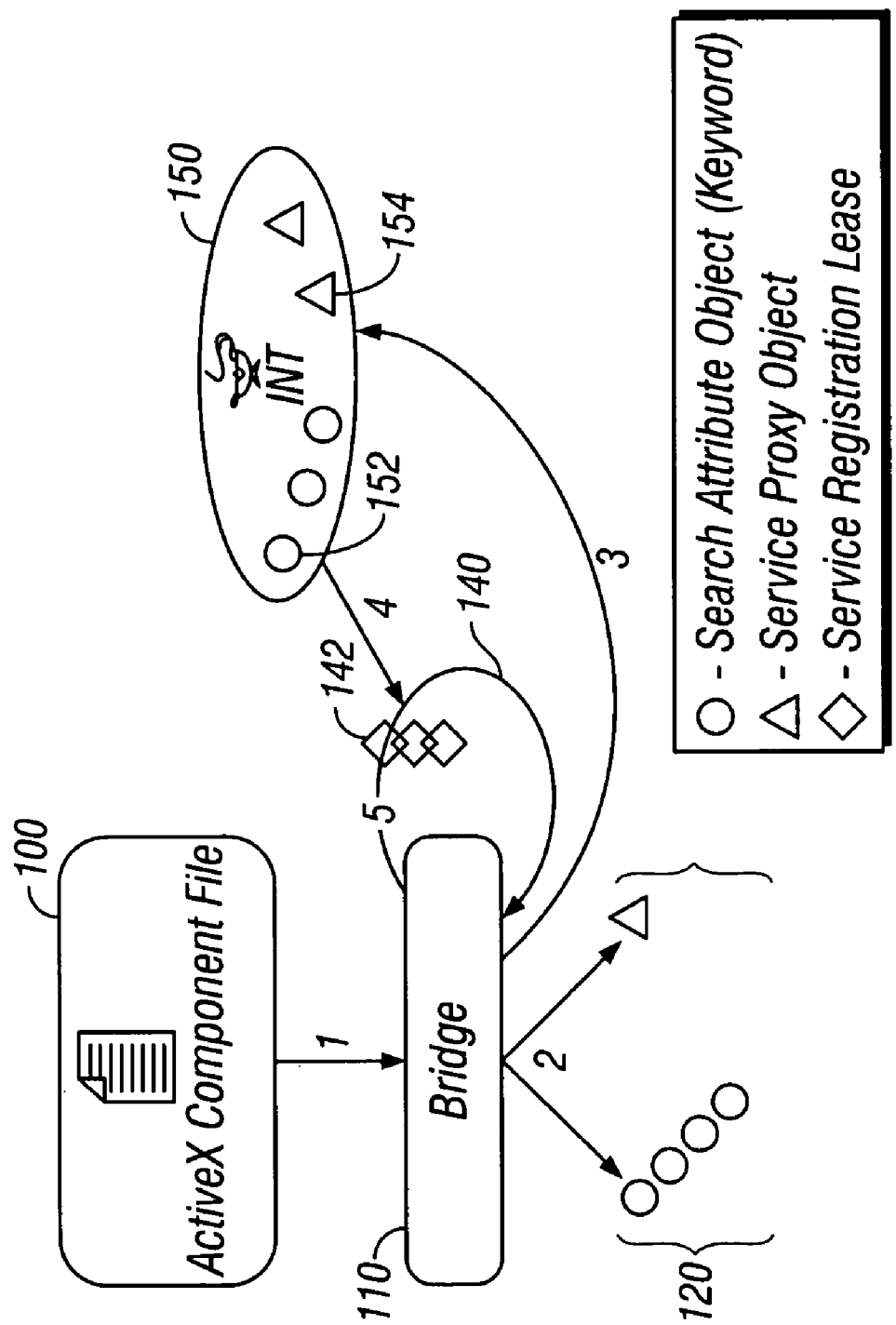
FIG. 1 shows an operation of the bridge of the present system, forming an interface between non Java services and a Jini™ broker.

The operation is shown in FIG. 1. A Java™ service normally publishes itself or its proxy to Jini™, along with a set of search attributes that can be used by services that are searching among the services. According to the present system, a non Java™ service 100 is published, using a Java™ compliant "wrapper", as described. The wrapper acts like Java proxy code, and points to the non Java™ service, in the same way that Java™ proxy code would point to the Java™ service.

A GUI (Graphical User Interface) allows a user to point and click the location of a service interface file representing the non-Java™ component, here an ActiveX component. For example, this may be an OCX file for an activeX component 100 as shown in FIG. 1. The point and click operation is used to instruct the bridge 110 to publish the service.

Figure 2:
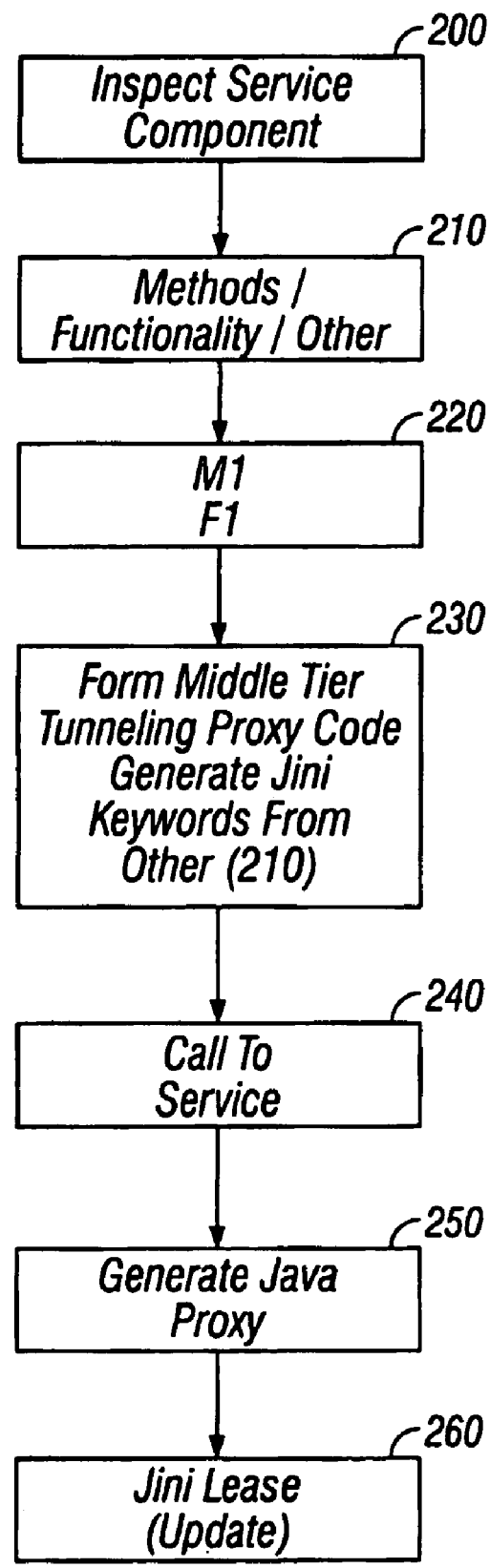
FIG. 2 shows a flowchart of operation of the system.

The bridge 110 operates as shown in the flowchart of FIG. 2. At 200, the bridge performs run-time introspection of the service component 100. At 210, the bridge identifies the methods/functionality within the service. This can use dynamic inspection and/or keywords, metatags, or other kinds of application inspection. At 220, these results are stated as a list of different functionalities and other relevant information. FIG. 1 shows the functionalities graphically as 120. This list will be used to form the eventual code.

At 230, this system forms middle tier tunneling proxy code 140 to form a bridge between the client and the service. Other information obtained from introspection at 210 is used to generate search attributes. These form keywords which are used to supplement the keyword repository in Jini™. In addition to the keywords identified by introspection, a user may also specify additional keywords in the Graphical User Interface (GUI).

Jini™ stores the proxy objects and a set of search attribute objects shown as 152, 154, shown in FIG. 1.

The Jini™ service is shown as 150. A client, or a service-proxy for the client, makes a call to the backend service wrapper object. The wrapper object redirects the call to the actual Component Object Model ("COM") or CORBA component. Each time such a call is made, the bridge 110 generates code that redirects the calls to the service 100. The generated code may be Java™ proxy code.

At 260, the bridge receives a Jini™ lease object based on the successful registration of the Jini™ object. The lease object shown as 142 keeps the object definition up-to-date. The bridge renews the lease from time to time, thereby insuring up-to-date information in Jini™.

A service is published to Jini™ in the following way. First, the service is serialized as a Java™ object, if it can be so serialized. Other, non Java™ compliant services are packaged as described above. Services which are incapable of being serialized into Jini™ may publish their proxies instead. Constraints such as heaviness, native dependability, and the like may prevent the service from directly publishing to Jini™. The proxy is a serializable lightweight Java™ object that acts as the service delegate. The proxies act as middle tiered objects allowing access of services on the back end. The object or proxy is sent to Jini™, along with a set of search attributes. Once the Java™ objects have been transported to Jini™, they are delivered to clients responsive to notifications of service matches.

Another aspect is to allow publishing either Jini™ or non Jini™ services. Any service that is capable of serialized in itself, and publishing itself to Jini™, would do so directly. This enables clients to directly use the service objects.

Non Jini™ services may not have a proxy, or such a proxy may need to be generated as part of the Jini™ registration process.

Certain distributed application environments allow services to register with them through an identifier. One example is a GUID key for COM components.

Figure 3A:
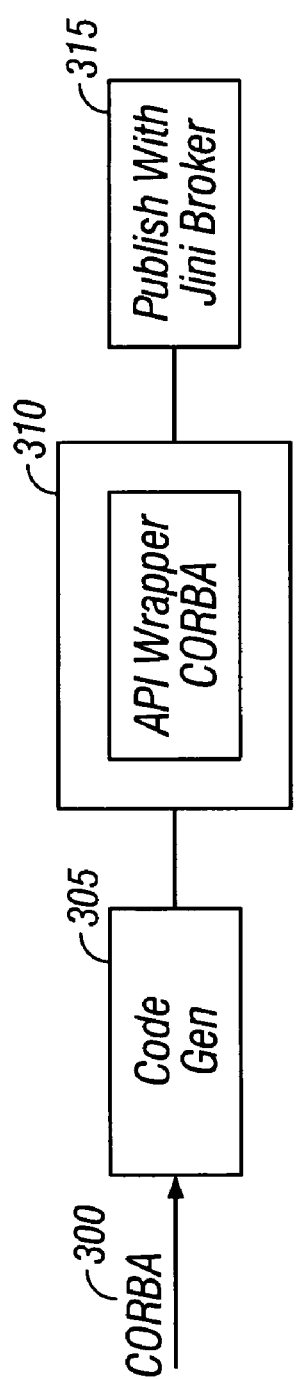
FIGS. 3A and 3B show an example of encapsulating CORBA component.
Figure 3B:
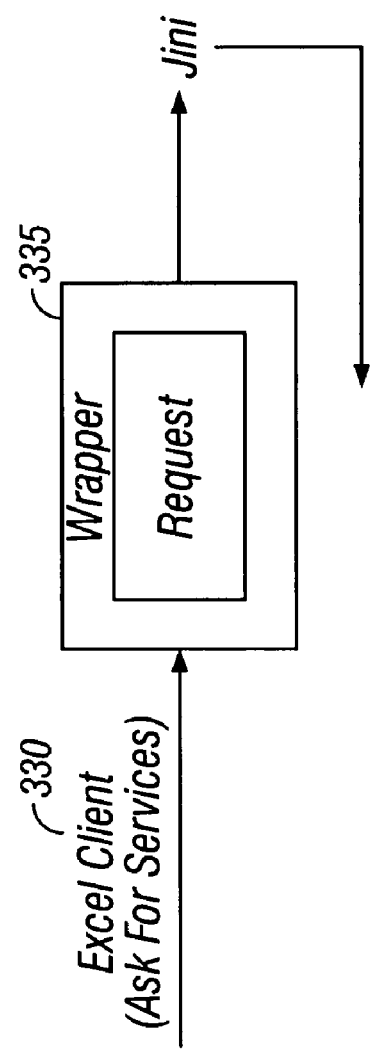

As an example of operation, FIG. 3 shows how the system could publish and obtain different information. A service 300, e.g., a CORBA service is coupled to the code generator 305 which provides an wrapper around the CORBA shown as 310. Once in the wrapper, the CORBA code appears to the broker or proxy as Java™ code, i.e., it is no different like any other Java™ application. At 315, the application is published with the Jini™ broker. FIG. 3B, shows a client, which is a non Java™ client such as an Excel(TM) client asking for services. At 330, the request for services is also placed in a wrapper at 335 and placed to Jini™. Jini™ returns the request.

Although only a few embodiments have been disclosed in detail above, other modifications are possible.

What is claimed is:

1. A method, comprising:
   obtaining a non Java™ object;
   converting said non Java™ object into a wrapped object which has certain attributes of a Java™ object; and
   publishing said wrapped object with a broker that publishes information about Java™ objects.

2. A method as in claim 1, wherein said broker is a Jini™ broker.

3. A method as in claim 2 further comprising obtaining a Jini™ lease, which automatically updates the broker if a service is still up and running.

4. A method as in claim 1 wherein said wrapped object is formed with a wrapper.

5. A method as in claim 1, wherein said converting comprises inspecting said non Java™ object to determine at least one aspect of said non Java™ object.

6. A method as in claim 5 wherein said at least one aspect includes keyword information, which can be used by the broker in a search.

7. A method as in claim 6, further comprising searching said broker for keywords, and finding said non Java™ object based on said searching.

8. A method as in claim 5, wherein said at least one aspect includes at least one of methods or functionality.

9. A method as in claim 5, further comprising tunneling proxy code based on said aspects.

10. A method as in claim 1, further comprising automatically updating information in said broker.

11. A method As in claim 1, wherein said wrapped object has a format of Jini™ proxy code.

12. A computer system, comprising:
    a first portion, storing a non Java™ object;
    a bridge portion, which automatically investigates said non Java™ object, and wraps said non Java™ object into a wrapped object with a wrapper that appears to have certain attributes of a Java™ object; and
    a communication element, providing said wrapped Java™ object to a broker for Java™ objects.

13. A computer system as in claim 12, further comprising a broker for Java™ objects, connected via a communication link with said communication element.

14. A computer system as in claim 13, wherein said bridge portion also produces information indicative of at least a plurality of aspects of said non Java™ object, and provides said information to said broker.

15. A computer system as in claim 14, wherein said aspects include keywords indicating a functionality of said non Java™ object.

16. A computer system as in claim 13, wherein said broker is a Jini™ broker.

17. A computer system as in claim 16, wherein said wrapped object is wrapped to have asked attributes of Jini™ proxies.

18. A computer system as in claim 12, wherein said bridge further stores a Java™ object which forces said attributes to be updated at specified intervals.

19. A method, comprising:
    converting a non Java™ object into a wrapped object which has certain attributes of a Java™ object;
    providing said wrapped object to a Jini™ broker which publishes various information about said Java™ object; and
    automatically updating said various information.

20. A method as in claim 19, wherein said automatically updating comprises obtaining a Java™ object which requires automatic updating at specified intervals.

21. A method as in claim 20, wherein said wrapped object is wrapped in a way which simulates a Jini™ proxy.

22. An apparatus comprising a machine-readable storage medium having executable instructions for enabling a machine to:
    obtain a non Java™ object;
    convert said non Java™ object into a wrapped object which has certain attributes of a Java™ object; and
    provide information in a way which allows said Java™ object to be provided to a broker wherein said converting comprises automatically searching for functionality of said non Java™ object.

23. An apparatus as in claim 22, wherein said converting also comprises automatically obtaining keywords about said functionality.

24. An apparatus as in claim 22, wherein said converting comprises adding keywords manually by a user through a graphical user interface.

25. A method, comprising:
    determining information about a service that performs specified operations;
    determining if said service has certain attributes of a Java™ object, and converting a non Java™ object into a wrapped object which has certain attributes of a Java™ object; and
    providing said service to a Jini™ broker which publishes various information about said object.

26. A method as in claim 25, wherein said determining if said service comprises wrapping said Java™ object to look like a Java™ proxy code.

* * * * *